US011632299B1

(12) United States Patent
Sudabattula et al.

(10) Patent No.: US 11,632,299 B1
(45) Date of Patent: Apr. 18, 2023

(54) CELL MANAGEMENT FOR SERVICES IMPLEMENTED AT CLOUD COMPUTING ENVIRONMENTS

(71) Applicant: Amazon Technologies, Inc., Seattle, WA (US)

(72) Inventors: Samatha Sudabattula, Surrey (CA); Scott M King, Port Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/805,778

(22) Filed: Jun. 7, 2022

(51) Int. Cl.
*H04L 12/725* (2013.01)
*H04L 12/741* (2013.01)
*H04L 12/747* (2013.01)
*H04L 12/859* (2013.01)
*H04L 12/931* (2013.01)
*H04L 12/46* (2006.01)
*H04L 41/0813* (2022.01)
*H04L 43/08* (2022.01)
*G06F 9/455* (2018.01)

(52) U.S. Cl.
CPC .......... *H04L 41/0813* (2013.01); *H04L 43/08* (2013.01)

(58) Field of Classification Search
USPC ........................................................ 709/219
See application file for complete search history.

(56) References Cited

U.S. PATENT DOCUMENTS

| 9,547,534 | B2 | 1/2017 | Dettori et al. | |
|---|---|---|---|---|
| 10,798,016 | B2 | 10/2020 | Salle et al. | |
| 11,005,733 | B2 | 5/2021 | Savov et al. | |
| 11,048,538 | B2 | 6/2021 | Shevade et al. | |
| 11,088,944 | B2 | 8/2021 | Allen et al. | |
| 11,218,364 | B2 | 1/2022 | Shevade et al. | |
| 2015/0356097 | A1 | 12/2015 | Chopra et al. | |
| 2020/0092138 | A1* | 3/2020 | Tillotson | H04L 12/4633 |
| 2020/0092193 | A1* | 3/2020 | Tillotson | H04L 45/04 |
| 2020/0092194 | A1* | 3/2020 | Tillotson | H04L 45/7453 |
| 2020/0092201 | A1* | 3/2020 | Tillotson | G06F 9/45558 |
| 2020/0092252 | A1* | 3/2020 | Tillotson | H04L 12/4633 |

* cited by examiner

*Primary Examiner* — Jude Jean Gilles
(74) *Attorney, Agent, or Firm* — Robert C. Kowert; Kowert, Hood, Munyon, Rankin & Goetzel, P.C.

(57) ABSTRACT

At a cell manager external to a network-accessible service, a set of data associated with a first isolated cell of the service is obtained. Service requests representing respective subsets of the workload of the service are processed at respective cells, with each cell comprising a number of request processing nodes. The cell manager analyzes the set of data, and initiates a configuration change at the first isolated cell based on results of the analysis.

20 Claims, 9 Drawing Sheets

- Failure impact ("blast radius") reduction 302
- Higher scalability 304
- Higher MTBF (mean time between failures) 306
- Lower MTTR (mean time to recovery) 308
- Higher overall availability 310
- Safer software deployment 312
- Improved testability 314
- Simplified service bring-up 316 (e.g., using CMS)
- Simplified post-bringup service administration 318 (e.g., using CMS)

CELL MANAGEMENT FOR SERVICES IMPLEMENTED AT CLOUD COMPUTING ENVIRONMENTS

BACKGROUND

Many applications and services are increasingly being implemented using resources of cloud computing environments. As the demand for a given service grows, the number of resources needed to process customer requests increases. For some popular cloud-based services, hundreds of thousands of request processing nodes may eventually be needed. Managing such large quantities of nodes can present a challenge, especially with regard to dealing with differences in workload levels of specific service clients, failures and upgrades.

BRIEF DESCRIPTION OF DRAWINGS

FIG. 3 illustrates example benefits of using a cell-based architecture for network-accessible services, as well as example benefits of using cell managers external to the service, according to at least some embodiments.

Figure 1:
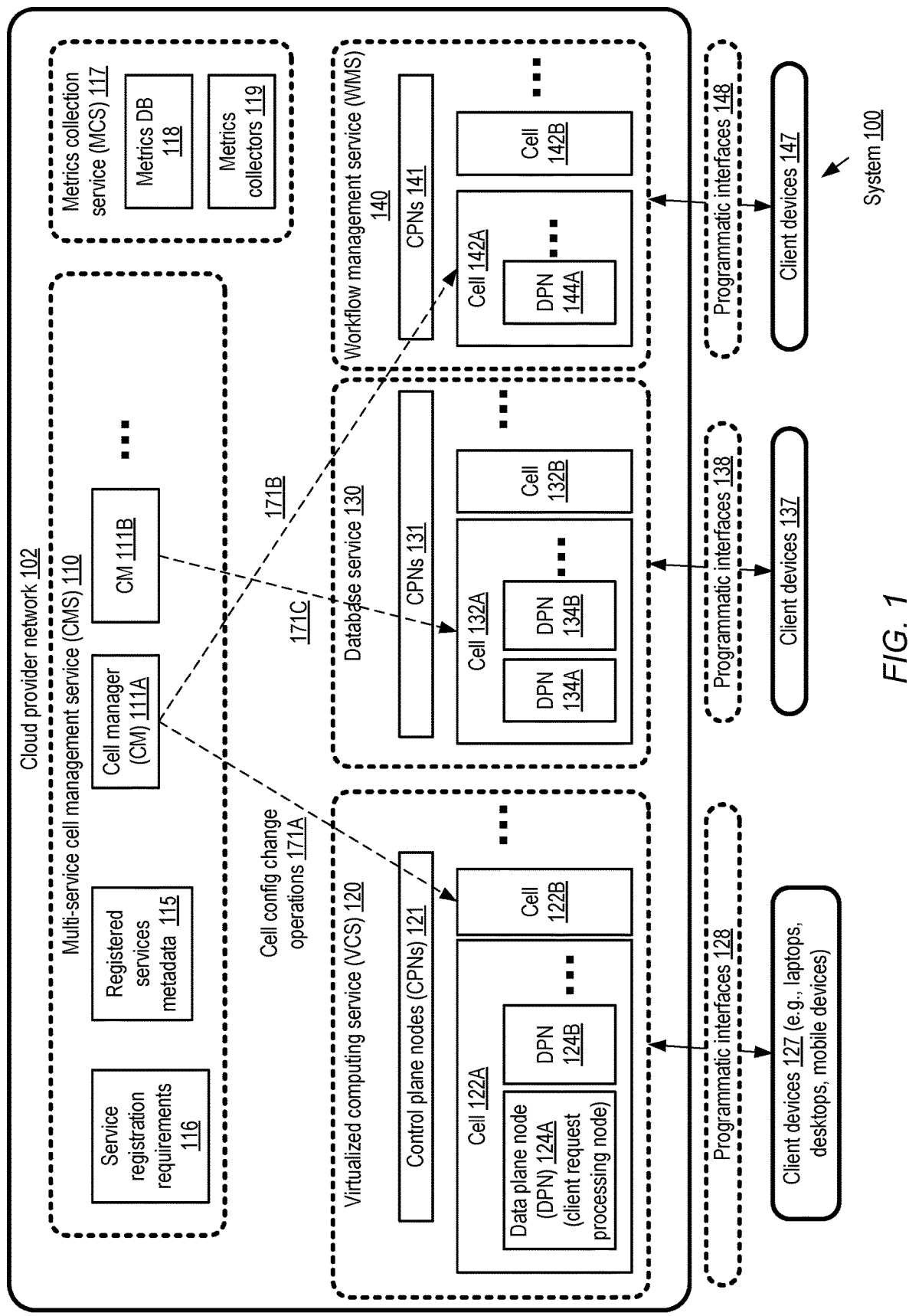
FIG. 1 illustrates an example system environment in which a multi-service cell management service may be implemented at a cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for simplifying the administration of large scale services, with each such service implemented as a collection of largely independent request processing cells, by configuring one or more cell managers external to the services for which the administration tasks are performed. A given cell can include some number (e.g., up to a service-specific maximum number) of request processing resources or nodes assigned to fulfill a selected subset of the workload of the corresponding service. Services that are implemented using such cells can be referred to as cell-based services, cell-oriented services or cellularized services. The workload of a given cell-based service can be divided into subsets (with each cell being assigned one or more of the subsets) along various dimensions, such as account identifiers of the clients on whose behalf service requests are to be processed, respective partitions or shards of the data being managed at the service on behalf of clients, groups of physical locations or network addresses from which service requests originate, and so on, depending on the nature of the service and the typical patterns of service requests. The cells may be described as being isolated or largely independent of one another because, under normal operating conditions, the service requests corresponding to a particular subset of the workload (e.g., service requests from a group of service request sources to which a given cell has been assigned) may be processed entirely within a single cell, requiring no communications across cells. Furthermore, administrative decisions such as addition of request processing resources to a given cell can be made independently of administrative decisions made with regard to other cells. Because of the subdivision and distribution of the workload, the impact of a failure within any given cell is limited; service clients whose workloads are assigned to other cells of the service remain unaffected by such failures.

In a cloud provider network or cloud computing environment, many different network-accessible services may be implemented using such cells, including services implemented by the operator of the provider network (such as a virtualized computing service (VCS), database services, object storage services and the like) as well as services implemented by clients or customers of the cloud provider network using resources (such as compute instances of the VCS and database instances of the database services) of the cloud provider network. Many of the types of administrative operations (e.g., setting up new cells, expanding or contracting existing cells, migrating workload between cells, etc.)

required for any given cell-based service are conceptually similar to the types of administrative operations required for other cell-bases services, although the specific lower-level tasks to be taken for implementation of a given type of administrative task may of course differ from one service to another. Motivated at least in part by the conceptual similarities in administrative requirements, a set of cell managers can be established at the provider network, with each cell manager capable of performing cell administration for many different services as needed. In some embodiments, a cell management service (CMS) may be implemented at the provider network, comprising some number of cell managers which can monitor cells and initiate cell administration/configuration tasks for a set of other network-accessible services registered with the CMS. After a service has been registered at the CMS (which may require the service to comply with a set of requirements published by the CMS), certain types of cell administration operations of the service may be performed automatically by the CMS, e.g., based on policies specified by the service owners or administrators, or based on default policies developed at the CMS. The service owners may in effect be able to delegate a substantial portion of administrative tasks to the CMS, thereby substantially reducing the administrative resources needed to be deployed at the service itself.

A given cell-based service may typically comprise both data plane and control plane subcomponents. The data plane represents the movement and processing of user data, while the control plane represents the movement of control signals or administrative commands. The control plane generally includes one or more control plane nodes distributed across and implemented at one or more control servers. The data plane includes customer resources that are implemented on the cloud provider network (e.g., compute instances, containers, block storage volumes, databases, or file storage, depending on the service). Data plane traffic generally includes non-administrative operations such as transferring customer data to and from the customer resources, performing computations on the customer data based on the business logic of the service, and so on. In at least some embodiments, a collection of data plane nodes (DPNs) of a cell-based service may be grouped into cells, while control plane nodes (CPNs) of the service may respond to cell administration commands issued by the cell managers by performing lower-level tasks on the data plane node cells. The CMS may in effect implement higher-level, multi-service control plane functionality for several different services, while the CPNs of a given service may implement the lower-level steps, specific to the service, which have to be taken to implement the logical administrative commands issued by the CMS. In at least some embodiments, the CPNs of some cell-based services may also be organized as a collection of cells, at least some of which can also be managed using the CMS.

In order for a service to be registered at and managed by a CMS, in various embodiments a set of requirements may have to be satisfied by the service. Such requirements may include supporting a set of service-agnostic programmatic interfaces (e.g., application programming interfaces (APIs)) that can be invoked by cell managers of the CMS to initiate administrative operations, such as interfaces for creating new cells, deleting cells, expanding cells by adding new request processing nodes, contracting cells, etc. In various embodiments, the cell managers may obtain metrics or monitoring reports generated with respect to the existing cells of a service, determine whether any cell configuration changes are required based on the metrics or monitoring results, and initiate any such changes by sending commands using the appropriate programmatic interfaces to CPNs of the service. After a service is registered, its cells may be managed by the CMS regardless of the underlying resources used for processing of requests at the service, and regardless of the lower-level steps (e.g., steps for activating, setting configuration parameters of, or de-activating individual DPNs) that may have to be initiated to complete the cell management operations initiated by the CMS in various embodiments.

As one skilled in the art will appreciate in light of this disclosure, certain embodiments may be capable of achieving various advantages, including some or all of the following: (a) reducing the amount of computing, memory, storage, networking and other resources required to perform various types of administrative tasks at a service implemented using resources of a provider network, (b) substantially easing the launch of new scalable network-accessible services at a provider network, and/or (c) standardizing logging and debugging tasks across multiple services, thereby simplifying the workload of service administrators.

According to some embodiments, a system may include one or more computing devices. The computing devices may include instructions that upon execution on or across the one or more computing devices may obtain, at a particular cell manager (CM) of a plurality of cell managers of a multi-service CMS of a provider network, respective sets of metrics from various isolated cells of one or more network-accessible services. For example, a first set of metrics collected from a first isolated cell of a plurality of isolated cells of a first network-accessible service implemented at least in part at the provider network may be obtained at the particular CM, and a second set of metrics collected from a second isolated cell of a second network-accessible service may also be obtained at the particular CM. During a default mode of operation of an isolated cell of a given network-accessible service, requests from a first set of clients of the service may be processed at the isolated cell without communication between that isolated cell and another isolated cell of the service. The term default mode refers to a mode of operation in which workload of the isolated cell is not being migrated to another cell; during such migrations, inter-cell communication may be required. Individual ones of the isolated cells of the various network-accessible services may comprise a respective collection of request processing nodes configured to perform operations requested by one or more clients of the service. Based at least partly on analysis of respective sets of metrics of the cells of different services, different types of administrative operations may be initiated by the particular CM. For example, based on analysis of the metrics collected from the first cell of the first network-accessible service, the particular CM may cause a first set of configuration changes at the first cell, such as increasing the number of request processing resources included in the first cell. A second set of configuration changes (which may not include increasing the number of request processing resources) may be initiated at the second cell of the second network-accessible service based on analysis of metrics pertaining to the second cell in at least some embodiments. The metrics that led to the initiation of different sets of changes at the different services may all have been collected during at least partially overlapping time periods in at least some embodiments. The analysis of the metrics from multiple cells of multiple services may be performed at least partially in parallel at the particular CM in various embodiments, and the configuration changes may be performed at least partially in parallel as well.

A wide variety of metrics may be obtained from service cells and analyzed by CMs to initiate configuration changes in different embodiments. Such metrics may include, for example, service request arrival rates, resource utilization metrics, failure metrics, and/or request fulfilment latency metrics or response times. In some embodiments, the metrics may be collected from the cells by an intermediary service, such as a monitoring service implemented at the provider network, and provided to the CMs by the intermediary service; in other embodiments, the metrics may be collected by the CMs themselves. According to one embodiment, data other than metrics, pertaining to the cells of a service, may be obtained at a CM and analyzed to initiate configuration changes—for example, data indicating a planned maintenance event such as an upgrade to software or hardware of a cell may trigger configuration changes such as migration of workload to a different cell. An indication of a regulatory compliance requirement (such as a new rule requiring data pertaining to a set of end users to be retained within the country or state in which those end users reside) may cause CM-initiated configuration changes in some embodiments.

In at least some embodiments, as indicated above, a CM may transmit commands to control plane nodes (CPNs) of the services to initiate the configuration changes. In one embodiment, at least some of the cells of a given service may be created by a CM. Pre-existing cells that were created earlier, e.g., by administrators of a given service prior to the registration of the service with a CMS, may also be managed from the CMS after the service is registered in some embodiments. CMs may delete or deactivate cells (e.g., by disabling, freeing, or repurposing request processing nodes of the cells) in some embodiments as needed, or make changes to tunable parameter settings at cell nodes as needed.

A client of a CMS, such as the owner or administrator of a cell-based service, may provide various cell management policies or rules via programmatic interfaces to a CM or to a CMS in various embodiments. Such policies may, for example, indicate the respective triggering conditions for cell configuration changes to be initiated from the CMS, and how (e.g., using which specific tools or logs) such conditions are to be detected. In some embodiments, a client may provide indications of the segmentation or partitioning logic to be used to subdivide the overall workload of the service among cells, and the CMS may assign different subsets of the workload (e.g., requests from different groups or sets of request sources) to various cells. In some embodiments, the CMS may provide various kinds of cell-level metrics to CMS clients, such as metrics of request arrival rates per cell, resource utilizations per cell, performance or workload imbalances among cells during various time intervals, and so on. An indication of the registration requirements for services at the CMS may be published or provided via programmatic interfaces of the CMS in some embodiments, enabling potential clients to determine the kinds of interfaces and measurement data that has to be provided to the CMS for the CMS to start automated management of the service's cells.

In at least some embodiments, as indicated above, a CMS may be implemented as part of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, at least a subset of the resources being used to process service requests at a given service cell may be located within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Some edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to a CMS and a VCS, data processing service(s) (e.g., map reduce, data flow, and/or other large scale data processing techniques), data storage services (e.g., object storage services, block-based storage services, or data warehouse storage services), other kinds of packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service or VCS (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

FIG. 1 illustrates an example system environment in which a multi-service cell management service may be implemented at a cloud provider network, according to at least some embodiments. As shown, system 100 comprises resources and artifacts of numerous services implemented at a cloud provider network 102, such as multi-service cell management service (CMS) 110, a metrics collection service (MCS) 117, and several network-accessible services comprising respective cells of data plane nodes (DPNs). The cell-oriented services may include, among others, a virtualized computing service (VCS) 120, a database service 130, and a workflow management service (WMS) 140 in the depicted embodiment. The workflow management service may be used, for example, to enable complex workflows or pipelines of tasks to be scheduled, managed and executed at the provider network based on requirements specified by WMS clients. The cloud provider network may include additional services not shown in FIG. 1, such as machine learning services, code development and deployment services, and so on, some of which may also be implemented using cells.

In the embodiment depicted in FIG. 1, several of the services of provider network 102 may implement respective sets of programmatic interfaces which can be used by clients or customers of the services to submit requests pertaining to the service and receive corresponding responses. The service-specific programmatic interfaces may for example include one or more web-based consoles, command line tools, APIs, graphical user interfaces and the like. Using service-specific programmatic interfaces 128, 138 and 148, for example, clients of the VCS, the database service and the WMS may submit requests from respective sets of client devices (e.g., desktops, laptops, or mobile computing devices 127, 137 or 147).

At least some of the services implemented at the provider network 102, including the VCS, the database service and the WMS, may include a respective set of administrative or control plane nodes (CPNs) and data plane nodes (DPNs). For example, VCS 120 includes CPNs 121 and DPNs 124A and 124B, database service 130 includes CPNs 131 and DPNs 134A and 134B, and WMS 140 includes CPNs 141 and DPN 144A. The DPNs of these services may be organized as respective collection of isolated or independent cells, such as cells 122A (which includes DPNs 124A and 124B) and 122B of VCS 120, cells 132A (including DPNs 134A and 134B) and 132B of database service 130, and cells 142A (including DPN 144A) and 142B of WMS 140.

The overall workload of service requests of a given cell-based service (such as the VCS, the database service or the WMS) may be divided into subsets in the depicted embodiment, and one or more subsets may be assigned to a given cell of the service. Any of a number of criteria or rules may be used to subdivide the workload in different embodiments—e.g., in some cases the workload may be subdivided based on service request source metadata (e.g., the client accounts on whose behalf requests are submitted, the Internet Protocol (IP) address range from which the requests are submitted, the geographical locations from which the requests are submitted, the kinds of devices such as phones versus laptops being used to submit the requests, and indication of the urgencies or relative priorities of the service requests, etc.), based on the subset or shard of customer data being accessed (e.g., which particular database tables are to be read or written to), and so on. The work required to respond to requests of a given subset of the workload may typically (e.g., during normal operating conditions or default modes of operation of the cells, when migrations of workloads are not in progress from one cell to another) be performed entirely within a single cell, and may not require any communication or message flow across multiple cells. In the event of a failure at a given cell, the failure may impact at most the clients whose workload has been assigned to that cell, and may have no impact on other clients in the depicted embodiment.

Cell-based services such as VCS 120, database service 130 and/or WMS 140 may be registered for automated administration by multi-service cell management service (CMS) 110 in the depicted embodiment. The CMS may publish a set of service registration requirements 116, which can be accessed via programmatic interfaces of the CMS by owners/designers/administrators of cell-based services, or services which have not yet been implemented in a cell-oriented manner but are targeted for cell-based implementation. The service registration requirements may indicate a set of service-agnostic programmatic interfaces that each service to be registered is expected or required to support in some embodiments. Support for such interfaces may enable cell managers 111 (such as CM 111A or CM 111B) of the CMS to initiate configuration changes pertaining to the cells of registered services, based on triggering conditions detected by the CMs. Registered services metadata 115 may include, for example, network address of CPNs at each of the registered services, information about existing cells of the services (if any such cells have been created and populated with DPNs prior to registration of the service), cell management policies provided via programmatic interfaces of the CMS by CMS clients, records of cell metrics obtained at the CMS, and so on.

In various embodiments a number of different types of triggering events or conditions may cause a CM to initiate configuration changes at the cells of registered services. For example, in some embodiments the provider network 102 may comprise a metrics collection service (MCS) 117, whose metrics collectors 119 may extract various types of raw measurements from the nodes of various services and store them in metrics database 118, from which CMs 111 may obtain curated, summarized or aggregated metrics pertaining to various cells. Such metrics obtained by a CM from the metrics collection service with respect to one or more cells of one or more registered services may include, among others, service request arrival rates, resource utilization metrics, failure metrics, and/or request fulfilment latency metrics or response times in various embodiments. In one embodiment, CMs may request to be automatically notified by the MCS if the metrics collected during a given time interval from one or more cells satisfy a threshold criterion—e.g., if the average CPU utilization of the DPNs of a cell exceeds X % for T seconds. In some implementations, the CMs may obtain the metrics directly from the DPNs of the registered services instead of using an intermediary service such as the MCS. In at least some embodiments, configuration changes may be initiated not just on the basis of analysis of collected metrics, but also or instead based on other types of data pertaining to registered services, such as notifications of planned or scheduled maintenance events (including upgrades/updates/bug fixes to hardware or software components of the services), notifications of regulatory changes, and so on.

A given CM may be assigned to administer a group of cells of one or more services in some embodiments, with the specific assignments of each CM being included in the registered services metadata 115. A given CM may obtain metrics collected from cells of several different registered cell-based services, such as cell C1 of service Svc1 and cell C2 of service Svc2, and analyze the metrics of the different cells. Based on the respective results of the analyses, different cell configuration changes may be initiated with respect to respective cells by a CM. For example, in the scenario depicted in FIG. 1, based CM 111A may initiate cell configuration change operations 171A (such as adding one or more DPNs) at cell 122B of VCS 120 and cell configuration change operations 171B (such as deactivating one or more DPNs) at cell 142A of WMS 140. Similarly, CM 111B may initiate cell configuration change operations 171C at cell 132A of database service 130 based on analysis of metrics. The cell configuration changes initiated by a CM may include not only changes to the configuration of existing cells, but also the creation of new cells, deactivation/decommissioning of entire cells, migration of workload subsets from one cell to another, and so on. In scenarios in which CMS clients have specified various cell management policies, the configuration changes initiated by a CM may be based at least partly on the policies (e.g., the CM may interpret data or metrics about cells in view of the client-specified policies to determine the specific changes to be made). In at least one embodiment, to cause some types of configuration change at a registered service, a CM 111 may transmit one or more commands to a CPN of the service, or the CM 111 may transmit one or more commands to CMS agents installed on the DPNs of the registered service.

In addition to analyzing the data pertaining to the cells of a service and taking configuration change actions when appropriate, in some embodiments CMs 111 may present cell-related metrics to CMS clients via programmatic interfaces of the CMS. Such metrics may include, for example, request arrival rates per cell, average resource utilization levels per cell, performance or workload imbalances among cells during various time intervals, and so on. In some embodiments, a CM may assign respective subsets of service workloads to individual cells, e.g., by providing guidance to a set of request routers of the services (not shown in FIG. 1) indicating how respective cells (and specific DPNs within the cells) should be selected for requests from different request sources.

In the example scenario shown in FIG. 1, the CMS manages cell administration tasks for a set of services implemented by the operator of provider network 102, such as the VCS, the WMS etc. In at least some embodiments, customers or clients of the provider network may design and establish/deploy their own cell-oriented services using resources of such provider network services, such as some combination of compute instances run at DPNs 124 of the VCS, workflow managers implemented at DPNs 144 of the WMS, and so on. For example, one customer of the provider network may implement a video streaming service using resources of the provider network services, another customer may implement an e-retail store, and so on. Such customer-designed and customer-established services may also comprise cells of request processing nodes, built on top of the request processing nodes of the provider network services. If a customer-established service meets the service registration requirements 116 and the customer-established service is successfully registered at the CMS, the CMs 111 may be used to perform administration operations for the cells of the customer-established service in the depicted embodiment.

Figure 2:
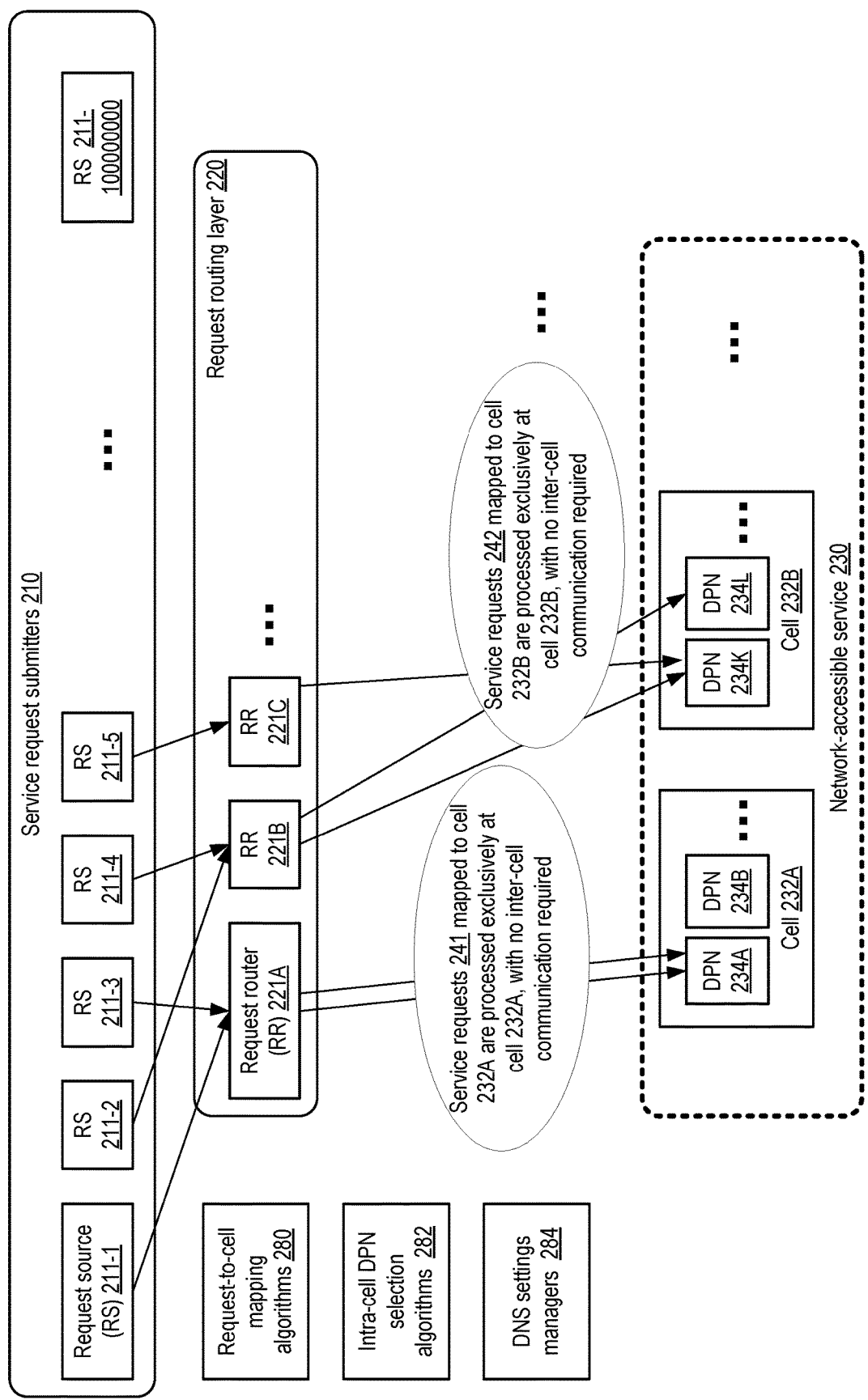
FIG. 2 illustrates an example scenario in which service requests from respective subsets of request submitters may be processed exclusively within cells identified using request-to-cell mapping algorithms, according to at least some embodiments.

FIG. 2 illustrates an example scenario in which service requests from respective subsets of request submitters may be processed exclusively within cells identified using request-to-cell mapping algorithms, according to at least some embodiments. In the scenario shown in FIG. 2, requests for tasks to be performed at a network-accessible service 230 may be received from a large number of service request submitters 210 or request sources (RSs) over some time period, such as 10 million request sources RS 211-1, RS 211-2, RS 211-3, RS 21-14, RS 211-5, . . . , RS 211-10000000. Request sources may be distinguished from one another, for example, based on respective user identifiers, client identifiers, device identifiers of the devices used to submit the requests, IP addresses, and/or other properties.

The requests may initially be received at request routers (RRs) 221 of a request routing layer 220 of the service 230 in the depicted embodiment. A particular request router, such as RR 221A, RR 221B, or RR 221C may be selected for a given service request based on various factors, such as random selection, proximity-based selection, hashing on one or more of the properties of the request sources or the individual requests, and so on. A request router in turn may be responsible for transmitting a given request to a selected data plane node (DPN) 234 of the service within a selected cell 232 of the service.

In at least some embodiments, request-to-cell mapping algorithms 280 (which may for example be selected by the administrators/owners of the service 230, and/or by cell managers of a CMS similar to CMS 110 of FIG. 1 in accordance with policies selected by the administrators/owners) may be provided to the request routers 221, enabling the request routers to identify the specific cells to be used for various requests. Similarly, in at least one embodiment, intra-cell DPN selection algorithms 282 (which may also be selected for example by administrators/owners of the service or by the CMS) may be provided to the request routers to enable the request routers to select a particular DPN within a cell as the destination for a particular request received from a request source. Different sets of request sources may in effect be assigned to respective cells in the depicted embodiment—for example, RSs 211-1 and 211-3 may be mapped to cell 232A, while RSs 211-2, 211-4 and 211-5 may be mapped to cell 232B. Using the request-to-cell mapping algorithms 280 and the intra-cell DPN selection algorithms, a service request 241 from RS 211-1, received at RR 221A may be mapped to cell 232A and sent to DPN 234A within cell 232A. Another service request sent from RR 211-3 may be received at RR 221A, mapped to cell 232A, and also sent to DPN 234A within cell 232A. A request from RS 211-2 may be sent via RR 221B to DPN 234L of cell 232B after being classified as a service request 242. RR 221B may send a request received from RS 211-4 to DPN 234K, and another request received from RS 211-5 at RR 221C may be sent to DPN 234K, and so on.

Under most operating conditions, when migrations of service workloads across cells are not in progress, service requests mapped to a given cell may be processed exclusively at that cell, with no inter-cell communication required. If and when a cell manager determines that a portion of the workload of service 230 is to be migrated from a source cell (such as cell 232A) of the migration to a destination cell (e.g., cell 232B) selected for the migration, some messages may be exchanged between cells during the migration procedure, e.g., to transfer state information pertaining to the service requests from the source cell to the destination cell and/or to forward requests from the source cell to the destination cell.

In some embodiments, instead of using a request routing layer 220, DNS settings for a cell-based service 230 may be set to accomplish the same overall distribution of requests to DPNs. For example, DNS settings managers 284 may configure DNS settings at one or more DNS servers to cause the same destinations for the service requests to be selected as are selected using RRs 211.

FIG. 3 illustrates example benefits of using a cell-based architecture for network-accessible services, as well as example benefits of using cell managers external to the service, according to at least some embodiments. Failure impact reduction 302 (also referred to as "blast radius" reduction) may be achieved using cell-based approaches, because the number of clients whose applications are affected by any given failure at a cell may typically be restricted to at most the clients whose workloads are being processed by that cell. Cells may be considered bulkheaded or isolated units that provide containment for many common failure scenarios. With different cells being managed independently of each other, the probability of the same kind of failure or error occurring at multiple cells concurrently may be reduced.

Cells may also afford higher scalability 304 than traditional approaches to service architectures. While any given cell may comprise a limited number of request processing resources (up to a maximum cell size selected for the service), the total number of cells within a service may be expanded or scaled out relatively easily. In contrast, traditional scale-up approaches (in which an attempt to increase the performance capacity of individual resources is made as the workload increases) may have maximum resource size limitations, expose non-linear scaling factors or hidden contention points as the resource capacity is increased, and may quickly become too big to test easily.

Cell-based architectures may provide a higher MTBF (mean time between failures) 306 and lower MTTR (mean time to recovery) 308 than traditional approaches. Failures may be less frequent because cells may have a consistent cap on the number of resources included per cell, which makes it less likely that failures resulting from the use of large numbers of resources arise; similarly, the limits on cell size may make the number of resources that have to be checked for errors/failures smaller, so recovery times from failures may also be reduced. Higher overall availability 310 may be obtained partly as a consequence of the higher MTBFs and lower MTTRs, because in general there would be shorter failure events per cell than if the impact of failures were more widespread. Safer software deployment 312 may be obtained because upgrades/updates to software may be applied one cell at a time (or a few cells at a time) rather than across an entire service, so any problems introduced as a consequence of such deployment may have limited impact. The constraints on cell size may lead to improved testability 314, as the scale of the tests that have to be conducted may be limited compared to scenarios in which much larger collections of resources have to be tested together.

The use of cell managers of the kind introduced above, e.g., as part of a cell management service (CMS) similar to CMS 110 of FIG. 1, may make it much easier to add new services to a suite of services being implemented at a provider network in some embodiments. Such simplified service bring-up 316 may be facilitated because many service establishment tasks, such as creating new cells with a selected initial number of processing nodes each, may in effect be handed over to the cell managers. Simplified post-bring-up service administration 318 may also be facilitated as a result of using cell managers in various embodiments, as configuration changes required as a result of workload changes may be handled automatically by the cell managers, logging of administrative tasks may be performed in a standardized service-agnostic manner by the cell managers, and debugging that has to be performed for an application that uses multiple services may be made easier as a result of the standardized logging. Other benefits, not shown in FIG. 3, may also be obtained as a result of using a cell-based architecture and a set of service-agnostic cell managers.

Figure 4:
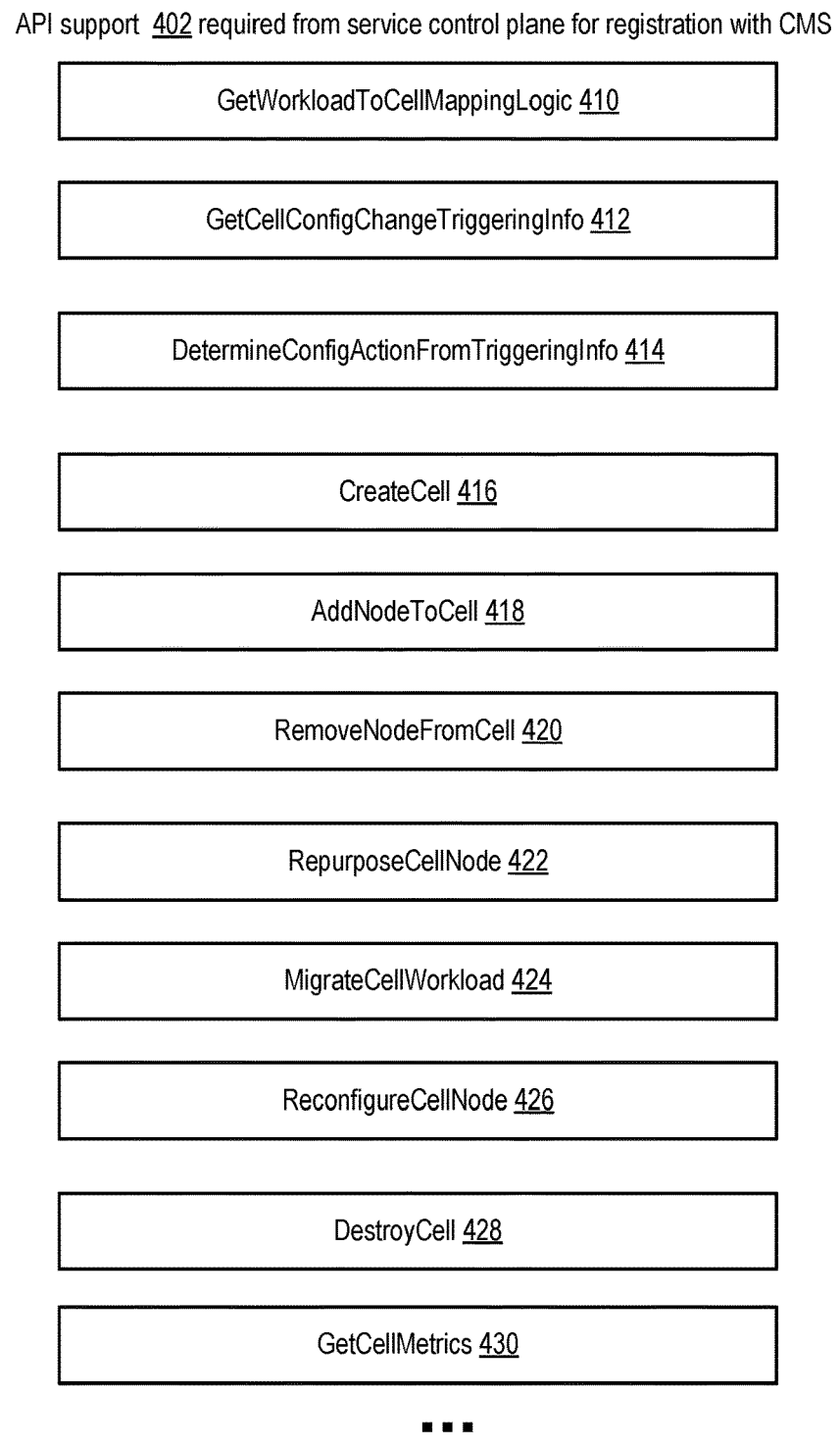
FIG. 4 illustrates example application programming interface (API) requirements which may have to be satisfied to register other services at a cell management service, according to at least some embodiments.

As mentioned earlier, a CMS similar to CMS 110 of FIG. 1 may require a set of registration requirements for network-accessible services whose cells are to be managed by the CMS. FIG. 4 illustrates example application programming interface (API) requirements which may have to be satisfied to register other services at a cell management service, according to at least some embodiments. API support 402, expected to be provided by control plane components of the to-be-registered services to enable various types of cell management operations to be initiated/controlled from the CMS, may for example include support for a GetWorkloadToCellMappingLogic API 410 which can be used by cell managers to choose a particular cell to be used for a particular subset of the workload of the service to be registered. Factors that may be used to map workloads to cells may include, for example, client identifiers (which may indicate the specific client on whose behalf a request is to be processed, and may be included as implicit or explicit parameters of service requests), the subset of a data set which is to be accessed for a request (e.g., a table identifier in the case of a database service request), the geographical region or location from which a service request is received, identity information (such as source IP address) of a service requester, the kinds of devices (e.g., models of phones or laptops of various vendors if such information is available in a service request), and so on. For example, clients may be given respective unique identifiers within a range (say 10 digit integers) by a service, and the identifiers may be provided to a hash function whose output indicates a cell identifier. Requests directed to tables T1, T4 and T7 of a database service may be assigned to a cell C1, requests directed to tables T2 and T4 may be assigned to cell C2, and so on.

A cell manager may obtain an indication of the triggering criteria that are to lead to cell configuration changes via a GetCellConfigChangeTriggeringInfo API 412 in the depicted embodiment. Such triggering criteria may include, for example, threshold values of various metrics (such as average resource utilization levels at a cell over a specified time interval) or notifications (such as notifications pertaining to maintenance events), etc. The specific configuration changes to be initiated in response to detection that a triggering criterion has been met may be indicated via a DetermineConfigActionFromTriggeringIInfo API 414—e.g., for a triggering condition C1, the API may indicate that an action such as "add a DPN of class C1 to the cell" should be initiated.

Invocation of a CreateCell API 416 may result in the establishment of a new cell in various embodiments. An AddNodeToCell API 418 may result in the instantiation of an additional node within a specified cell. A RemoveNodeFromCell API 420 may result in the removal or deactivation of a specified node from a specified cell. The RepurposeCellNode API 422 may be invoked to reuse an existing node for a different purpose than its current purpose—e.g., by changing the configuration of the node and deploying it for another service, freeing the resources of the node. A MigrateCellWorkload API 424 may be used to change the cell at which a specified portion of another cell's current workload is to be processed. Migration of cell workloads may for example include copying state information of the workload at the destination cell of the migration, and then causing the requests of that portion of the workload to be directed to the destination cell instead of the current cell. A ReconfigureCellNode API 426 may be used to change one or more configuration settings of a specified node, for example to enable faster processing of service requests directed to that node. Entire cells may be deleted, deactivated or removed from a service using the DestroyCell API 428. A GetCellMetrics API 430 may be utilized to obtain various cell-level metrics than can be provided to clients of the CMS, such as the rate at which requests are directed to each cell, the differences in average node resource utilization levels (e.g., CPU utilization, memory utilization etc.) among different cells, the number of workload migrations between cells in various time intervals, and so on.

Not all the APIs shown in FIG. 4 may be mandatory for all registered services in some embodiments. In one embodiment, for example, support for some of the APIs may be mandatory (such as CreateCell, AddNodeToCell, RemoveNodeFromCell, and DestroyCell) for registration, while support for others may be preferred but not essential. Other APIs than those shown in FIG. 4 may be required for registering services at a CMS in some embodiments.

Figure 5:
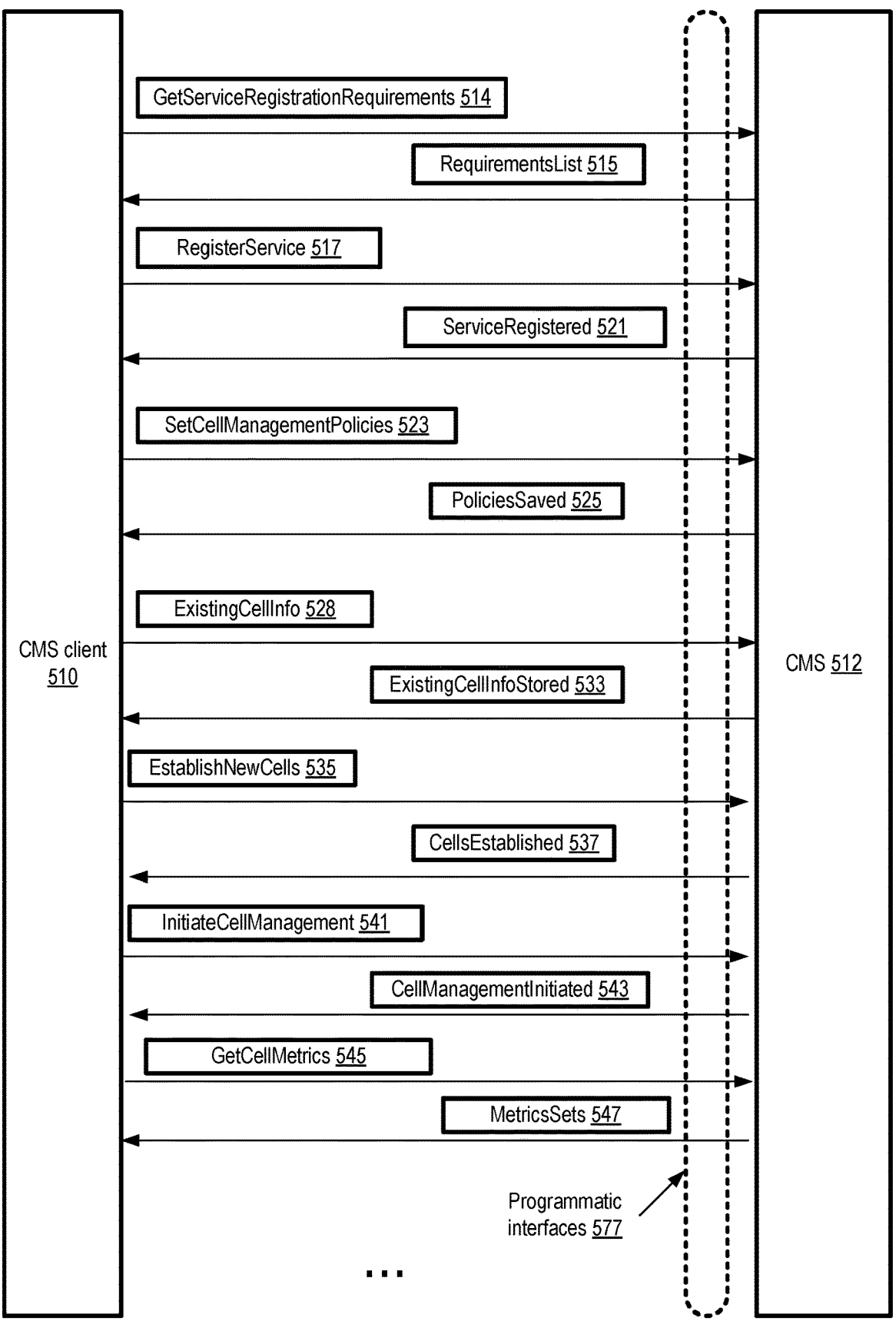
FIG. 5 illustrates example programmatic interactions between clients and a cell management service, according to at least some embodiments.

Clients of a CMS similar to CMS 110 of FIG. 1 may provide information about various aspects of their services to the CMS via programmatic interfaces. FIG. 5 illustrates example programmatic interactions between clients and a cell management service (CMS), according to at least some embodiments. CMS 512 may implement a set of programmatic interfaces 577, such as one or more web-based consoles, command-line tools, APIs, graphical user interfaces and the like for current or prospective CMS clients such as service owners or administrators in the depicted embodiment. Using the interfaces 577, a CMS client 510 may submit a GetServiceRegistrationRequirements request 514 in some embodiments, requesting information about the requirements a given service has to fulfill in order to be registered at the CMS. A list of requirements, such as support for APIs similar to those discussed in the context of FIG. 4, may be provided to the client via interfaces 577 in a RequirementsList message 515.

A RegisterService request 517 may be submitted by the client in various embodiments, providing details of a particular service which is to be registered for cell management. The details may for example include network addresses of control plane components of the service, to which the cell managers of the CMS 512 may send API requests of the kind shown in FIG. 4, as well as information about how the requests from the CMS are to be authenticated and authorized. Upon receiving the RegisterService request, in some embodiments the CMS may conduct a set of tests to verify that the registration requirements are satisfied by the service to be registered—e.g., a subset or all of the APIs to be supported by a registered service may be invoked by the CMS as part of the set of tests. If the tests succeed, metadata of the service may be stored at a repository maintained at the CMS, and a ServiceRegistered message 521 may be sent to the client in some embodiments.

A client may specify various cell management policies in one or more SetCellManagementPolicies requests 523 in the depicted embodiment. A cell management policy may, for example, indicate the respective triggering conditions for cell configuration changes to be initiated from the CMS, indicate the kinds of configuration changes to be made when triggering conditions are detected, provide the segmentation or partitioning logic to be used to subdivide the overall workload of the service among cells, and so on. In some embodiments, information about such policies may instead be obtained at the CMS via some of the APIs discussed in the context of FIG. 4, such as GetWorloadToCellMappingInfo, GetCellConfigChangeTriggeringInfo, DetermineConfigActionFromTriggeringInfo, and so on. The policies may be stored at a repository of the CMS, and a PoliciesSaved message 525 may be sent to the client in some embodiments.

In some cases, a service may already comprise several cells, created without using cell managers, before the service is registered with a CMS. Information about the existing cells may be provided to the CMS via one or more ExistingCellInfo messages 528 in some embodiments. The information may be stored at the CMS, and an ExistingCellInfoStored message 533 may be sent to the client in such embodiments.

New cells may be set up with the help of the CMS, e.g., for a new service which is being brought online, by submitting one or more EstablishNewCells requests 535 in the depicted embodiment. The requested cells may be established, and a CellsEstablished message 537 may be sent to the client.

A CMS client may request that automated cell management be initiated for one or more services by submitting an InitiateCellManagement request 541 in various embodiments. The CMS may then begin collecting metrics and other information about existing cells, and initiate cell configuration change actions when appropriate based on analysis of the collected metrics and information. A CellManagementInitiated message 543 may be sent to the client in some embodiments.

A CMS client may submit a GetCellMetrics message 545 in some embodiments to obtain cell-level metrics of the kind mentioned earlier (e.g., per-cell resource utilization levels, cell populations, service request rates per cell, and so on). The requested metrics may be provided via one or more MetricsSets messages 547 in the depicted embodiment. In some embodiments, an interactive graphical interface may be provided by the CMS, which can be used by CMS clients to view the status and metrics of different cells in real time, to get more details about specific metrics, and so on.

Figure 6:
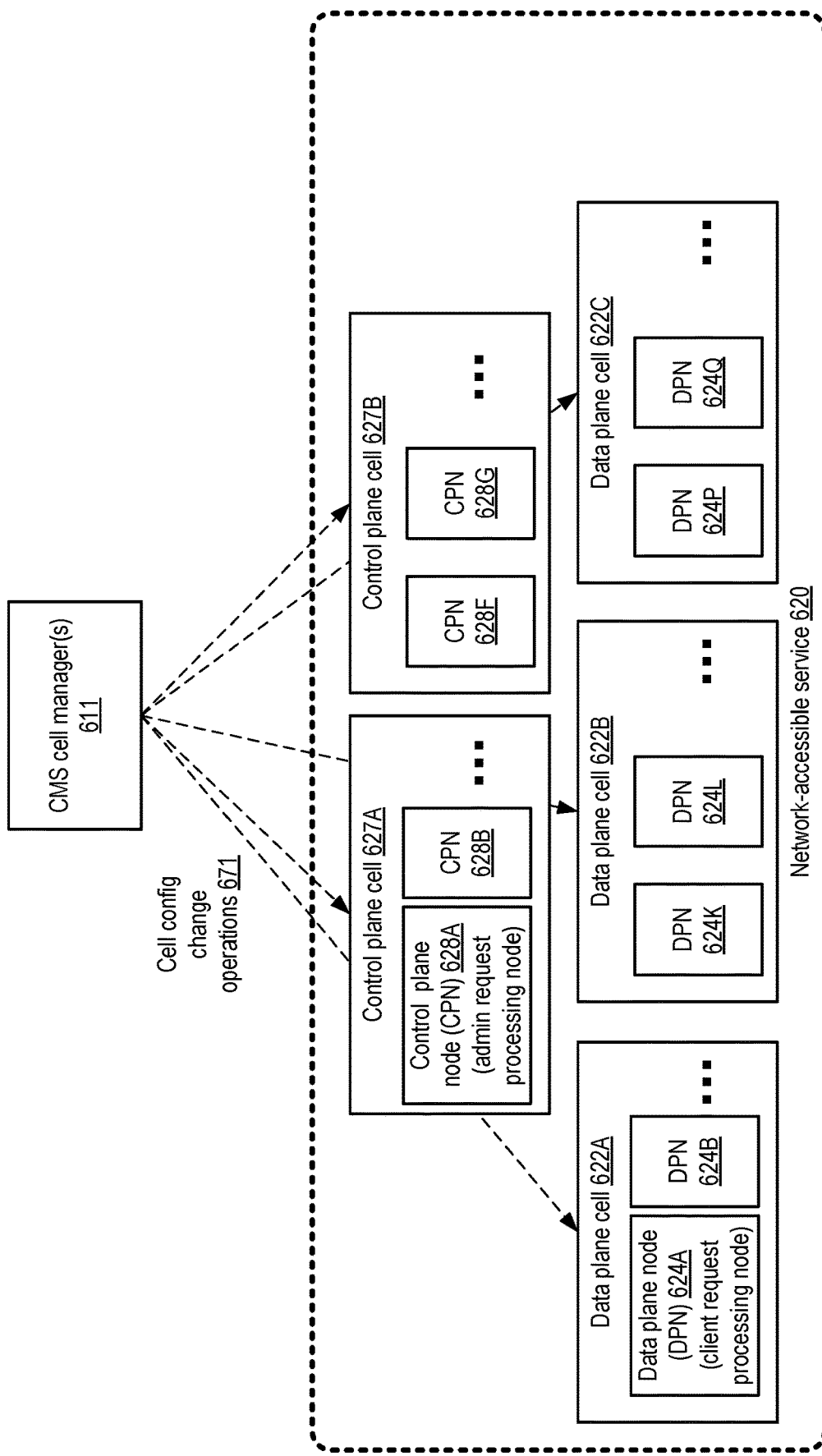
FIG. 6 illustrates an example scenario in which separate collections of control plane cells and data plane cells may be set up for a service, according to at least some embodiments.

In FIG. 1, data plane nodes of various services were shown organized into cells. A similar approach towards the management of control plane nodes of a service may be taken in various embodiments. FIG. 6 illustrates an example scenario in which separate collections of control plane cells and data plane cells may be set up for a service, according to at least some embodiments. In the depicted scenario, a network-accessible service 620 comprises several data plane cells 622, such as data plane cells 622A, 622B and 622C. Data plane cell 622A may for example include data plane nodes (DPNs) 624A and 624B, data plane cell 622B may include DPNs 624K and 624L, while data plane cell 622C may include DPNs 624P and 624Q. In addition, the control plane of the service 620 may also be divided into cells, such as control plane cells 627A and 627B.

Control plane cell 627A comprises control plane node (CPN) 628A and 628B, while control plane cell 627B comprises CPNs 628F and 628G. CPNs 628 may be responsible for processing administrative requests directed to the service 620, while data plane cells 622 may be responsible for processing service requests of clients of the service 620. A subset of the control plane nodes may be designated for handling requests directed to configuration changes at control plane cells in the depicted embodiment—for example, one control plane cell may comprise a set of primary CPNs that are responsible for handling requests to expand or contract other control plane cells at the request of CMS cell managers 611. The CMS cell managers may direct cell configuration change operations 671 to cells of both categories, e.g., in response to different types of triggering events. In one embodiment, the CMS itself may be cell-based—that is, a number of cells may be set up within the CMS, with each cell comprising some number of cell managers. The cells of the CMS may be managed using a special class of cell managers in such an embodiment.

Figure 7:
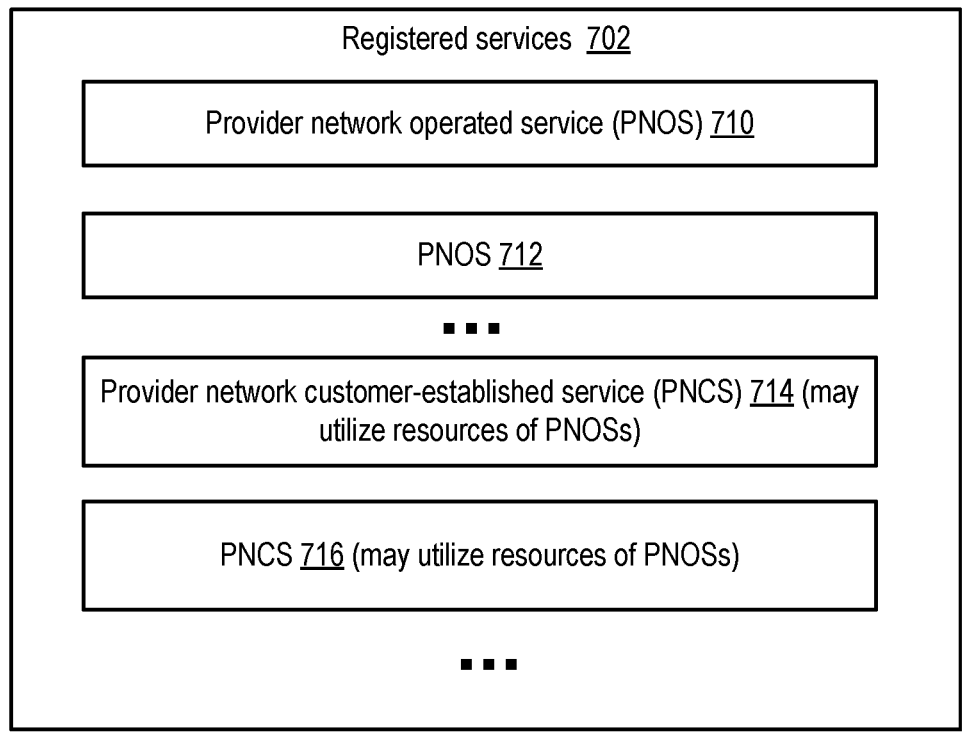
FIG. 7 illustrates an example scenario in which services established by customers of a provider network, as well as service implemented by the provider network operator, may be managed by a cell management service, according to at least some embodiments.

FIG. 7 illustrates an example scenario in which services established by customers of a provider network, as well as service implemented by the provider network operator, may be managed by a cell management service (CMS), according to at least some embodiments. The set of registered services 702 of a CMS similar in features and functionality to CMS 110 of FIG. 1 may include a provider network operated service (PNOS) 710 and a PNOS 712, as well as provider network customer-established services (PNCSs) 714 and 716. A given PNCS may, for example, be implemented using customer designed business logic running at (or accessing) resources of the PNOSs. In such embodiments, cell management operations may be performed at several levels by the CMS: at the level of the PNCSs, and also at the level of the PNOSs. In some cases, configuration changes initiated for cells of the PNCSs may lead to configuration changes for cells of the PNOSs, or vice versa.

Figure 8:
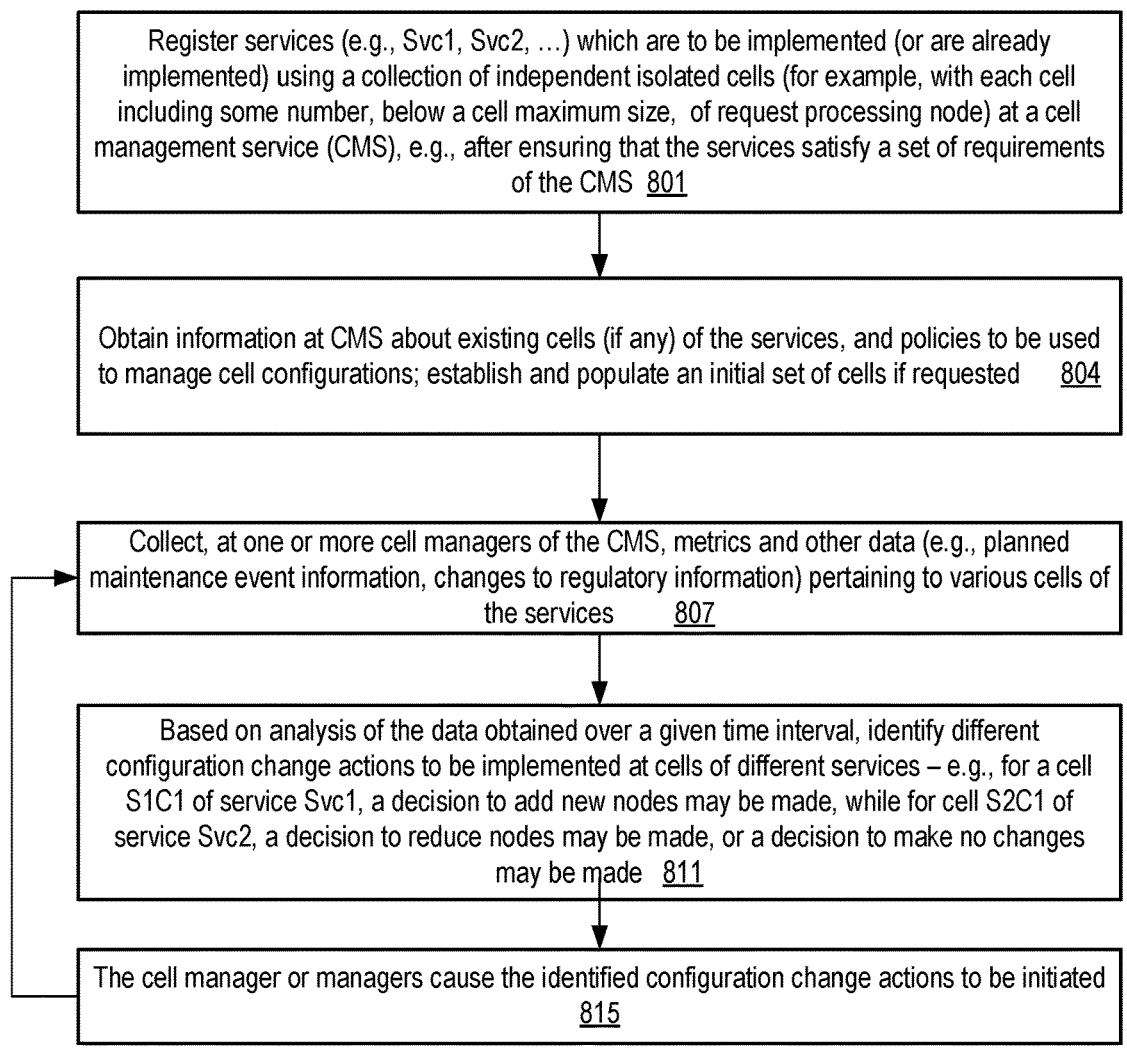
FIG. 8 is a flow diagram illustrating aspects of operations which may be performed to manage cells of a set of network-accessible services, according to at least some embodiments.

FIG. 8 is a flow diagram illustrating aspects of operations which may be performed to manage cells of a set of network-accessible services, according to at least some embodiments. As shown in element 801, a set of network-accessible services (such as Svc1, Svc2, etc.) which are to be implemented (or are already implemented) using a collection of independently managed isolated cells may be registered for cell management by a multi-service cell management service (CMS) similar in features and functionality to CMS 110 of FIG. 1. Individual cells of the registered services may include some number of request processing nodes, with the number capped at a cell maximum size (e.g., to simplify testability of the services). The types of request processing nodes and cells may differ from one service to another—e.g., a node may comprise a virtual machine or compute instance of a virtualized computing service of a cloud provider network for some services but not for other services, the maximum cell sizes may differ from one service to another, and so on. In at least some embodiments, the CMS may provide or publish an indication of service registration requirements, including for example a set of APIs (such as some of the APIs shown in FIG. 4) that a service has to support in order to be registered. Before a given service such as Svc1 is registered, in one embodiment the CMS may invoke such APIs, e.g., by sending commands including the APIs to control plane components within Svc1, to verify that Svc1 meets the registration requirements.

If a given service already includes some cells at the time that the service is registered, information about the existing cells may be obtained at the CMS in at least some embodiments (element 804). For example, administrators of service SC1 may invoke programmatic interfaces implemented by the CMS to provide identifiers of the cells, as well as network addresses of service control plane components that can be used by the CMS to initiate subsequent administrative operations with respect to the existing cells. In at least one embodiment, service-specific cell management policies may be specified to the CMS via programmatic interfaces by service owners or administrators, indicating for example the kinds of information to be considered triggers for configuration changes (and exceptions if any to such triggers), the specific types of configuration changes to be performed in response to detecting the triggering conditions, entities that are to be notified before initiating certain types of configuration changes, whether pre-approval is required for certain types of configuration changes, and so on. In some embodiments, if a new service is being brought online, the CMS may be used to establish/create and populate an initial set of cells with request processing nodes.

The CMS may comprise some number of cell managers in various embodiments, each implemented using some combination of software and hardware. In one embodiment a cell manager may be implemented using one or more compute instances of a VCS. The cell managers may collect metrics and other data (e.g., information about planned maintenance events such as software or hardware upgrades, information about new regulations or changes to regulations that can affect the manner in which the services are implemented or service client data is stored, etc.) pertaining to service cells in various embodiments (element 807). In some embodiments, a monitoring service implemented at the provider network may be used to collect metrics—e.g., each registered service may utilize APIs of the monitoring service to provide that service's metrics, and the CMS may use other APIs of the monitoring service to obtain summarized/aggregated versions of the metrics.

Based at least partly on analysis of the metrics and/or data obtained during a given time interval, different sets of configuration changes to be applied at respective cells of the services being managed may be identified by the cell managers (element 811). For example, for one cell S1C1 of service Svc1, a decision to add new request processing nodes may be made, while for a cell S2C1 of service Svc2, a decision to reduce request processing nodes may be made, or a decision that no changes are required may be made. Data collected from different services and different cells with respect to the same time interval, or overlapping time intervals, may be analyzed in parallel at a given CMS in some embodiments.

The identified configuration changes (if any are identified) may be initiated by a cell manager (element 815), e.g., by issuing API calls or commands to control plane components of the targeted services in various embodiments. The collection and analysis of data from the cells of different services may be conducted iteratively in the depicted embodiment, with operations corresponding to elements 807, 811 and 815 being performed in each iteration.

It is noted that in various embodiments, some of the operations shown in the flow diagram of FIG. 8 may be implemented in a different order than that shown in the figure, or may be performed in parallel rather than sequentially. Additionally, some of the operations shown in FIG. 8 may not be required in one or more implementations.

Figure 9:
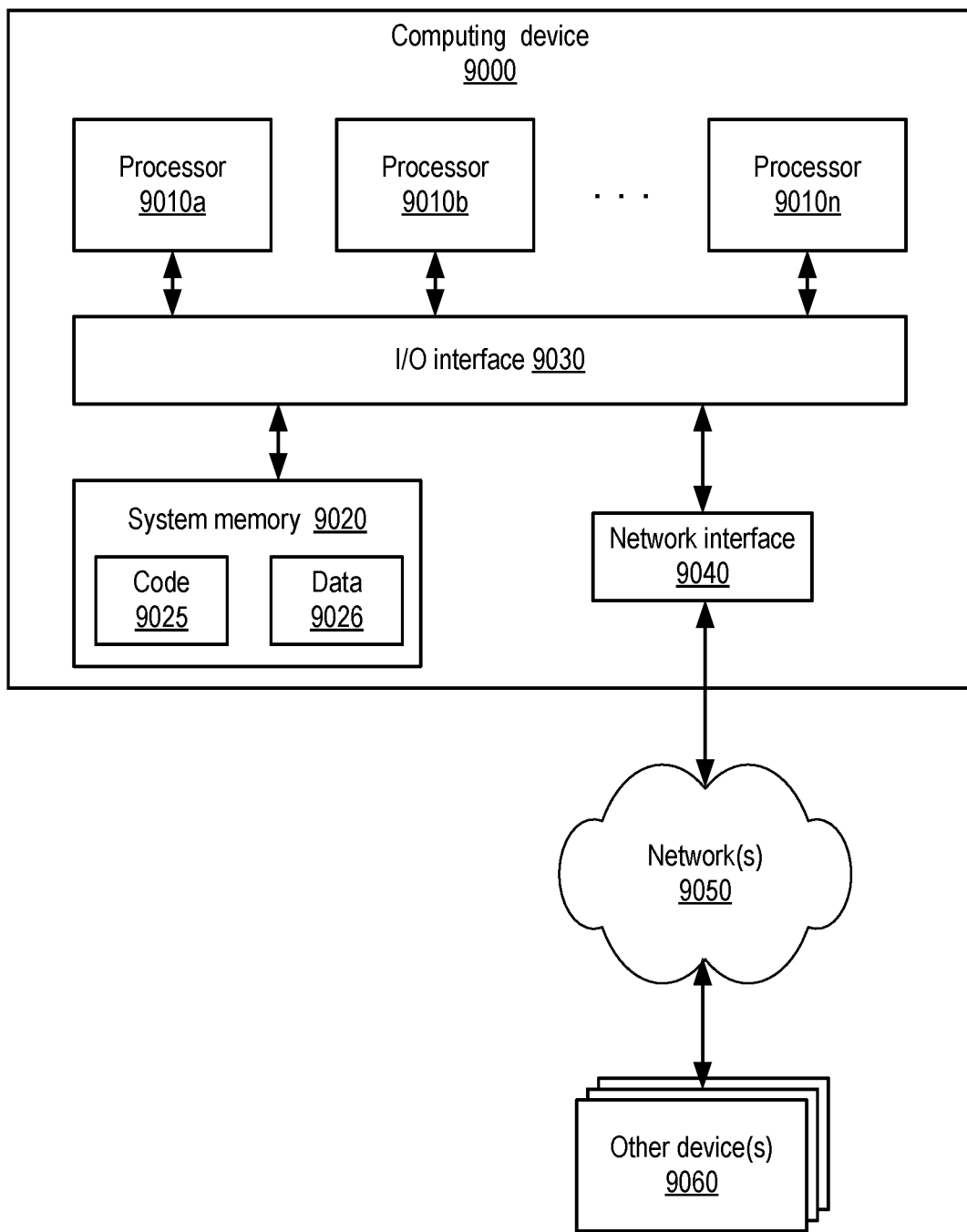
FIG. 9 is a block diagram illustrating an example computing device that may be used in at least some embodiments.

In at least some embodiments, a server that implements the types of techniques described herein (e.g., including functions of a cell management service, a metrics collection service, a VCS, and/or other services of a cloud provider network) may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors such as 9010a, 9010b, . . . , 9010n (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more non-volatile dual in-line memory modules or NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across the one or more computing devices:
   obtain, at a particular cell manager of a plurality of cell managers of a multi-service cell management service of a provider network, a first set of metrics collected from a first isolated cell of a plurality of isolated cells of a first network-accessible service implemented at least in part at the provider network, wherein during a default mode of operation of the first isolated cell, service requests from a first set of clients of the first network-accessible service are processed at the first isolated cell without communication between the first isolated cell and another isolated cell of the first network-accessible service, and wherein individual isolated cells of the plurality of isolated cells of the first network-accessible service comprise a respective collection of request processing nodes configured to perform operations requested by one or more clients of the first network-accessible service;
   obtain, at the particular cell manager, a second set of metrics collected from a second isolated cell of a plurality of isolated cells of a second network-accessible service implemented at least in part at the provider network, wherein during a default mode of operation of the second isolated cell, service requests from a second set of clients of the second network-accessible service are processed at the second isolated cell without communication between the second isolated cell and another isolated cell of the second network-accessible service, wherein individual isolated cells of the plurality of isolated cells of the second network-accessible service comprise a respective collection of request processing nodes configured to perform operations requested by one or more clients of the second network-accessible service;
   cause, by the particular cell manager, based at least in part on analysis of the first set of metrics, a first set of configuration changes at the first isolated cell, wherein the first set of configuration changes includes increasing a number of request processing nodes included in the first isolated cell; and cause, by the particular cell manager, based at least in part on analysis of the second set of metrics, a second set of configuration changes at the second isolated cell, wherein the second set of configuration changes does not include increasing a number of request processing nodes included in the second isolated cell.

2. The system as recited in claim 1, wherein the one or more computing devices include further instructions that upon execution on or across the one or more computing devices:
verify, prior to registering the first network-accessible service as a service whose isolated cells are to be managed by the multi-service cell management service, that the first network-accessible service implements programmatic interfaces for a set of cell management operations.

3. The system as recited in claim 1, wherein the second set of configuration changes comprises migrating a portion of a workload of the second isolated cell to a different isolated cell of the plurality of isolated cells of the second network-accessible service.

4. The system as recited in claim 1, wherein the first set of metrics comprises one or more of: (a) a service request arrival rate, (b) a resource utilization metric, (c) a failure metric, or (d) a request fulfilment latency metric.

5. The system as recited in claim 1, wherein the one or more computing devices include further instructions that upon execution on or across the one or more computing devices:
obtain an indication of a scheduled maintenance event at the first isolated cell; and
cause another set of configuration changes at the first isolated cell in response to receiving the indication of the scheduled maintenance event.

6. A computer-implemented method:
obtaining, at a first cell manager, a first set of data associated with a first isolated cell of a plurality of isolated cells of a first network-accessible service, wherein during a default mode of operation of the first isolated cell, service requests from a first set of request sources of the first network-accessible service are processed at the first isolated cell without communication between the first isolated cell and another isolated cell of the first network-accessible service, and wherein individual isolated cells of the plurality of isolated cells of the first network-accessible service comprise a respective collection of request processing nodes;
obtaining, at the first cell manager, a second set of data associated with a second isolated cell of a plurality of isolated cells of a second network-accessible service, wherein during a default mode of operation of the second isolated cell, service requests from a second set of request sources of the second network-accessible service are processed at the second isolated cell without communication between the second isolated cell and another isolated cell of the second network-accessible service, wherein individual isolated cells of the plurality of isolated cells of the second network-accessible service comprise a respective collection of request processing nodes;
causing, by the first cell manager, based at least in part on analysis of the first set of data, a first set of configuration changes at the first isolated cell; and
causing, by the first cell manager, based at least in part on analysis of the second set of data, a second set of configuration changes at the second isolated cell.

7. The computer-implemented method as recited in claim 6, further comprising:
causing, by the first cell manager, establishment of the first isolated cell, wherein said causing comprises transmitting one or more commands to a control plane component of the first network-accessible service.

8. The computer-implemented method as recited in claim 6, further comprising:
causing, by the first cell manager, deactivation of the first isolated cell, wherein said causing comprises transmitting one or more commands to a control plane component of the first network-accessible service.

9. The computer-implemented method as recited in claim 6, wherein the first set of configuration changes comprises migrating a portion of a workload of the first isolated cell to a different isolated cell of the plurality of isolated cells of the first network-accessible service.

10. The computer-implemented method as recited in claim 6, wherein the first set of data comprises one or more of: (a) a service request arrival rate, (b) a resource utilization metric, (c) a failure metric, or (d) a request fulfilment latency metric.

11. The computer-implemented method as recited in claim 6, wherein the first set of data comprises an indication of a scheduled maintenance event at the first isolated cell.

12. The computer-implemented method as recited in claim 6, wherein the first set of data comprises an indication of a regulatory compliance requirement.

13. The computer-implemented method as recited in claim 6, further comprising:
obtaining, via a programmatic interface, an indication of a policy to be used by the first cell manager to determine configuration changes to be made to isolated cells of the first network-accessible service.

14. The computer-implemented method as recited in claim 6, wherein the first set of data comprises one or more metrics collected from the first isolated cell during a first time interval, and wherein the second set of data comprises one or more metrics collected from the second isolated cell during a second time interval, wherein the second time interval overlaps at least partly with the first time interval.

15. The computer-implemented method as recited in claim 6, wherein the first network-accessible service is a service established by a client of a provider network using resources of one or more other network-accessible services implemented by an operator of the provider network.

16. One or more non-transitory computer-accessible storage media storing program instructions that when executed on or across one or more processors:
obtain, at a first cell manager external to a first network-accessible service, a first set of data associated with a first isolated cell of a plurality of isolated cells of the first network-accessible service, wherein during a first mode of operation of the first isolated cell, service requests comprising a first subset of workload of the first network-accessible service are processed at the first isolated cell without communication between the first isolated cell and another isolated cell of the first network-accessible service, and wherein individual isolated cells of the plurality of isolated cells of the first network-accessible service comprise a respective collection of request processing nodes;
analyze, by the first cell manager, the first set of data; and
cause, by the first cell manager based at least in part on results of analysis of the first set of data, a configuration change at the first isolated cell.

17. The one or more non-transitory computer-accessible storage media as recited in claim 16, storing further program instructions that when executed on or across the one or more processors:

provide, via a programmatic interface, a respective indication of a cell-level metric from the first isolated cell and a second isolated cell of the plurality of isolated cells of the first network-accessible service.

18. The one or more non-transitory computer-accessible storage media as recited in claim 16, storing further program instructions that when executed on or across the one or more processors:

provide, via a programmatic interface of a cell management service which includes a plurality of cell managers including the first cell manager and a second cell manager, an indication of a set of interfaces to be supported by network-accessible services whose isolated cells are to be managed by the cell management service.

19. The one or more non-transitory computer-accessible storage media as recited in claim 16, storing further program instructions that when executed on or across the one or more processors:

cause, by the first cell manager, establishment of the first isolated cell by transmitting one or more commands to a control plane component of the first network-accessible service.

20. The one or more non-transitory computer-accessible storage media as recited in claim 16, wherein the configuration change comprises migrating a portion of a workload of the first isolated cell to a second isolated cell of the plurality of isolated cells of the first network-accessible service.

* * * * *